United States Patent [19]
Eros et al.

[11] Patent Number: 6,089,382
[45] Date of Patent: Jul. 18, 2000

[54] PRECISION HOLDING SYSTEM FOR A VEHICLE HOOD

[75] Inventors: George A. Eros, Howell; Daniel R. Waun, Dearborn; Laurent Chappuis, Grosse Pointe Park, all of Mich.

[73] Assignee: Ford Global Technologies, Inc., Dearborn, Mich.

[21] Appl. No.: 09/084,281

[22] Filed: May 26, 1998

[51] Int. Cl.[7] .................................................. A47F 5/00
[52] U.S. Cl. ......................... 211/13.1; 211/193; 206/448
[58] Field of Search .......................... 206/448; 211/13.1, 211/193, 41.1, 85.8

[56] References Cited

U.S. PATENT DOCUMENTS

| | | | |
|---|---|---|---|
| 1,698,974 | 1/1929 | Vance | 211/193 X |
| 2,760,647 | 8/1956 | Saul | 211/85.8 |
| 3,986,462 | 10/1976 | Heft . | |
| 4,397,432 | 8/1983 | Resetar | 211/193 X |
| 4,426,011 | 1/1984 | Jay | 211/193 |
| 4,921,100 | 5/1990 | Krause | 206/448 |
| 4,976,092 | 12/1990 | Shuert | 211/41.1 X |
| 5,000,997 | 3/1991 | Ritchie et al. . | |
| 5,141,114 | 8/1992 | Cate et al. | 206/448 X |
| 5,296,030 | 3/1994 | Young . | |
| 5,363,773 | 11/1994 | Chuang . | |
| 5,554,252 | 9/1996 | Foran . | |
| 5,682,667 | 11/1997 | Flagg . | |

*Primary Examiner*—Robert W. Gibson, Jr.
*Attorney, Agent, or Firm*—David B. Kelley

[57] ABSTRACT

A precision holding system for a vehicle hood includes a frame extending vertically and at least one pair of arms spaced transversely and extending horizontally from the frame. Each arms includes a master control pin disposed within a portion of a vehicle hood to locate the vehicle hood relative to the frame and a plurality of master control surfaces to hold the vehicle hood in a horizontal, design position while an adhesive between components of the vehicle hood cures.

20 Claims, 6 Drawing Sheets

PRECISION HOLDING SYSTEM FOR A VEHICLE HOOD

BACKGROUND OF THE INVENTION

1. Field of the Invention

The present invention relates generally to hoods for motor vehicles and, more particularly, to a precision holding system for a hood of a motor vehicle to prevent hood twist during adhesive curing of the hood.

2. Description of the Related Art

It is known to provide a rack for holding components prior to assembly of a motor vehicle. For example, U.S. Pat. No. 5,296,030 to Young discloses a painting rack for holding vehicle parts such as doors and fenders in a vertical position. It is also known to provide a rack to hold vehicle parts such as hoods in the vertical position to allow an adhesive between components such as an inner panel and outer panel of the hood to cure. Although this rack has worked well, it suffers from the disadvantage that the hood may change shape during curing or set-up of the adhesive, resulting in additional processes to correct the hood to its original intended or design shape. Therefore, there is a need in the art to provide a precision holding system to contain the hood and not allow the hood to change shape during adhesive curing or set-up between components of the hood.

SUMMARY OF THE INVENTION

Accordingly, the present invention is a precision holding system for vehicle hoods. The precision holding system includes a frame extending vertically and at least one pair of arms spaced transversely and extending horizontally from the frame. Each of the arms includes a master control pin to be disposed within a portion of a vehicle hood to locate the vehicle hood relative to the frame and a plurality of master control surfaces to hold the vehicle hood in a horizontal, design position while an adhesive between components of the vehicle hood cures.

One advantage of the present invention is that a precision holding system is provided for a vehicle hood to prevent hood twist during adhesive curing between components of the hood. Another advantage of the present invention is that the precision holding system holds a plurality of vehicle hoods in a horizontal, design position while the adhesive between hood components cures, thus, gaining bonding strength. Yet another advantage of the present invention is that the precision holding system does not allow the vehicle hood to change shape during adhesive curing between components of the hood.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
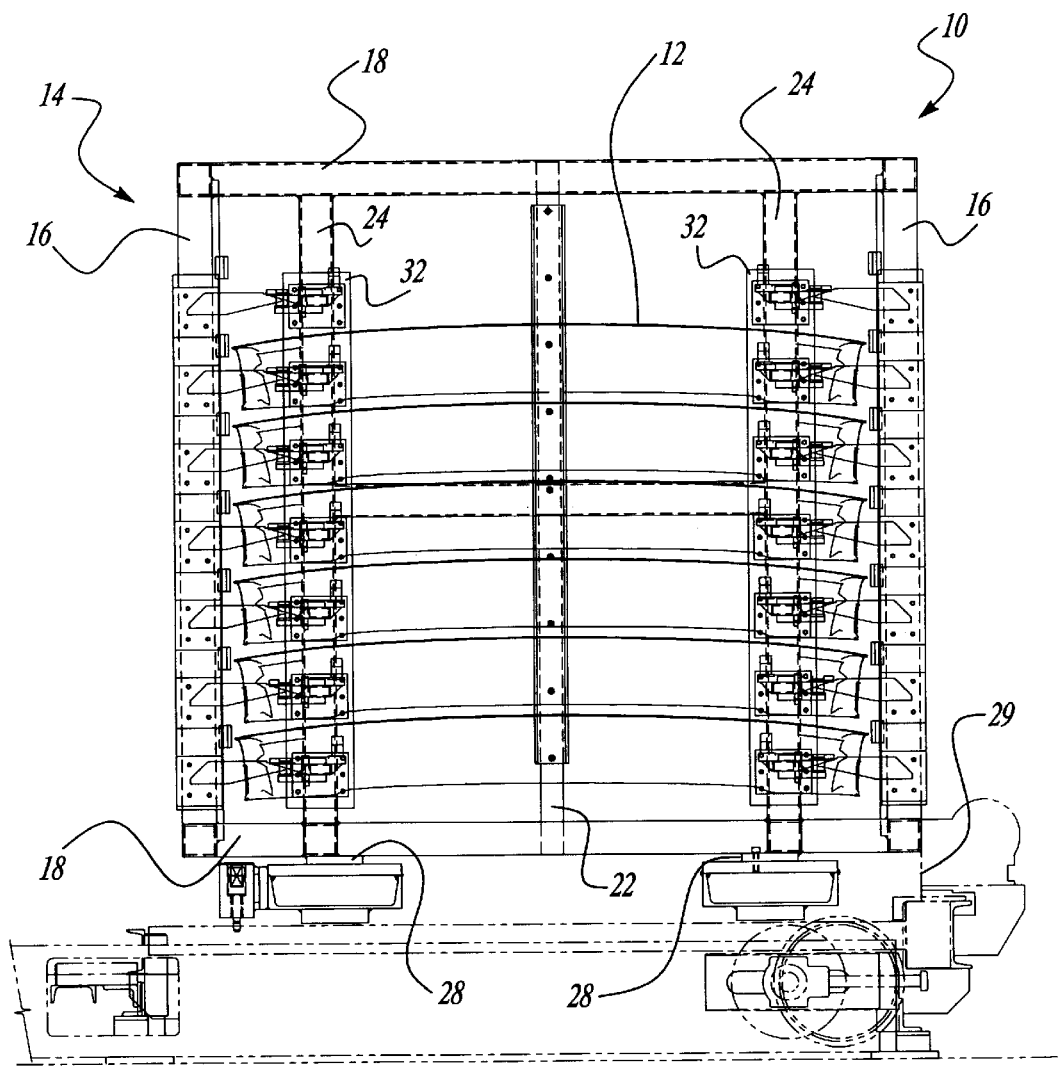
FIG. 1 is a front elevational view of a precision holding system, according to the present invention, illustrated in operational relationship with vehicle hoods.
Figure 3:
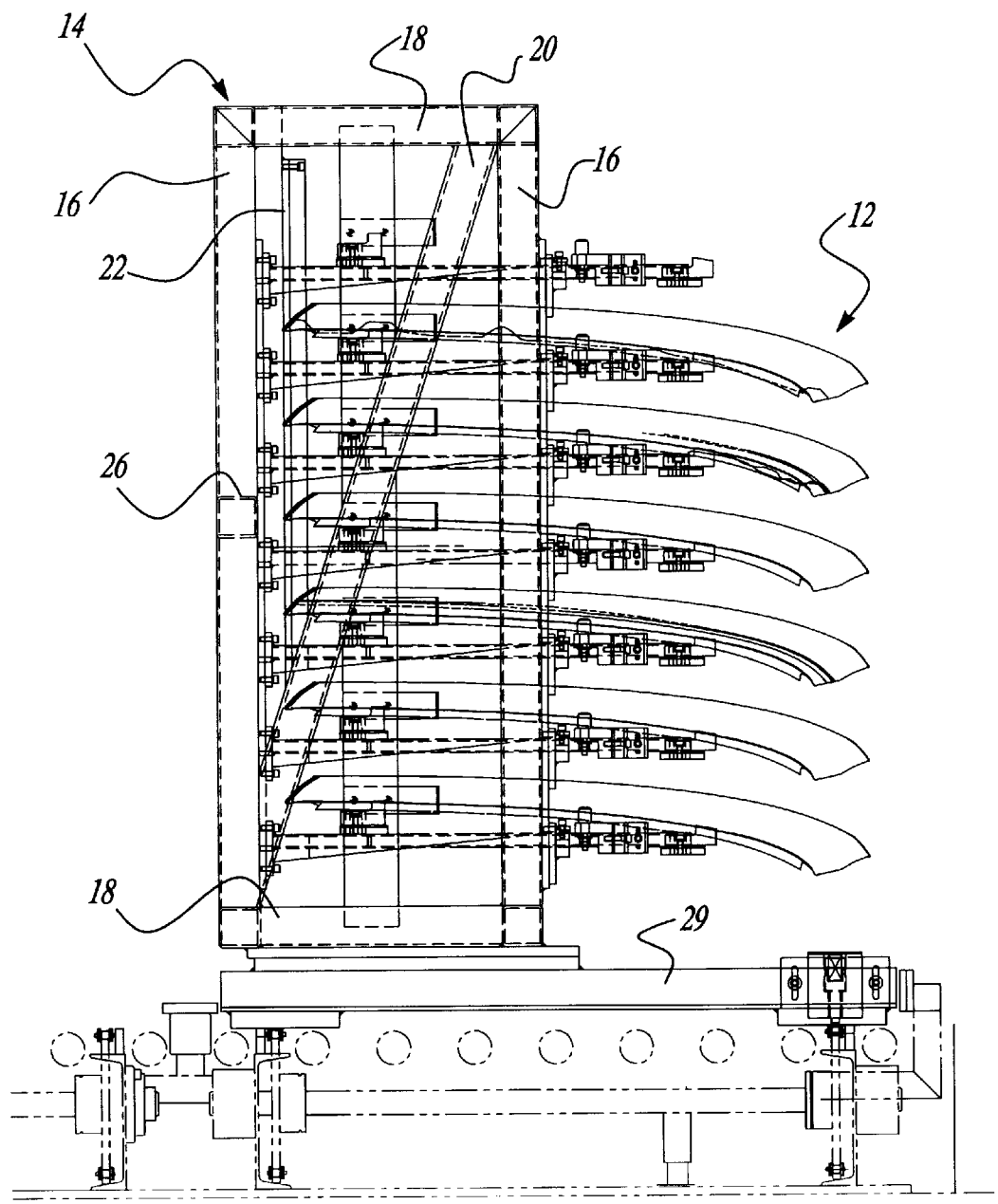
FIG. 3 is a side elevational view of the precision holding system and vehicle hoods of FIG. 1.

Referring to the drawings and in particular FIG. 1 and FIG. 3, one embodiment of a precision holding system 10, according to the present invention, is illustrated in operational relationship with at least one, preferably a plurality of vehicle hoods 12. The precision holding system 10 is used to contain or hold a plurality of vehicle hoods 12 in a horizontal, design position while an adhesive between components of the vehicle hood 12 cures or sets-up. It should be appreciated that the vehicle hood 12 is an assembly of components such as an inner panel and outer panel which are adhered together using a two component adhesive as is known in the art.

Figure 2:
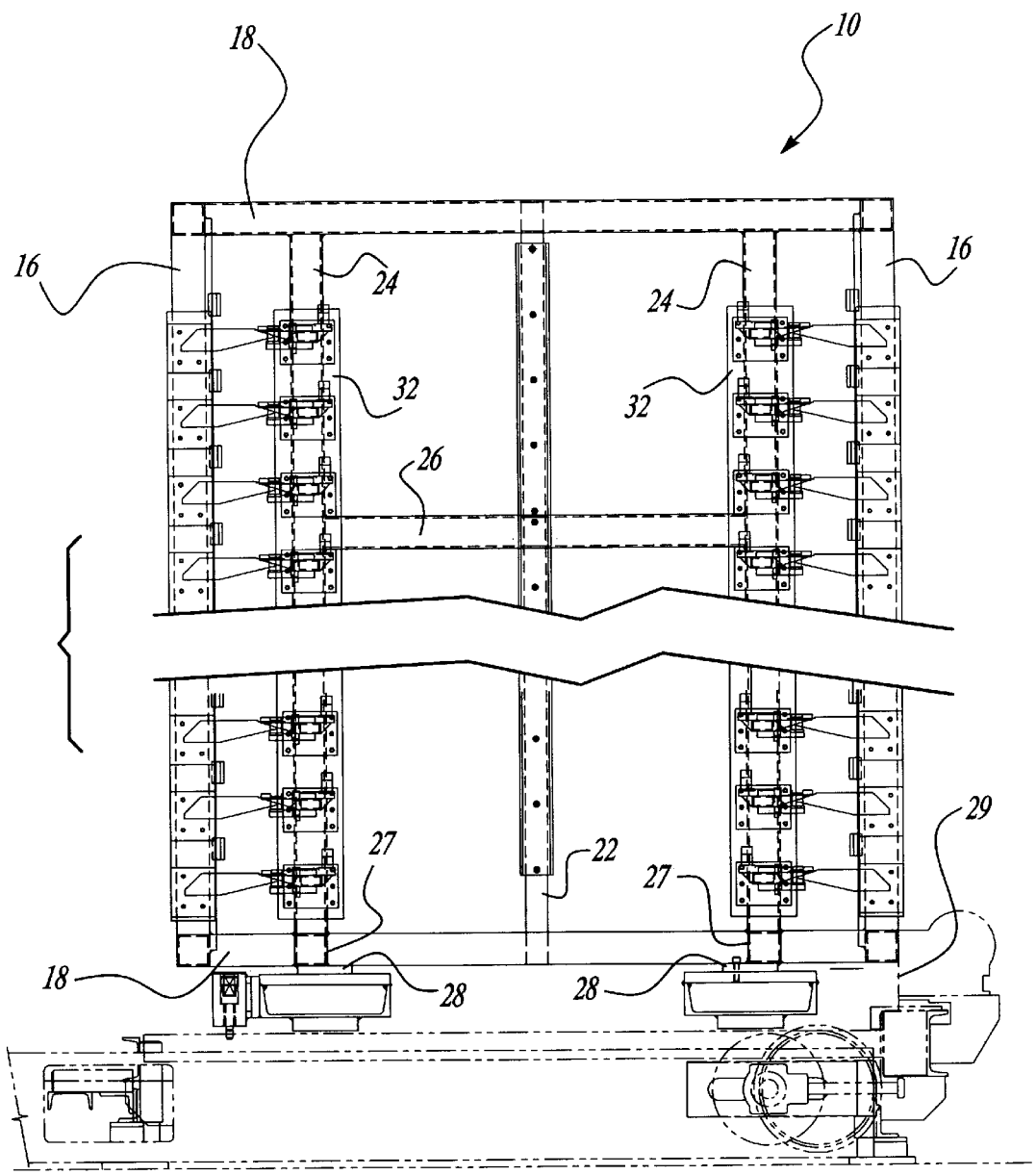
FIG. 2 is a view similar to FIG. 1 without the vehicle hoods illustrated.
Figure 4:
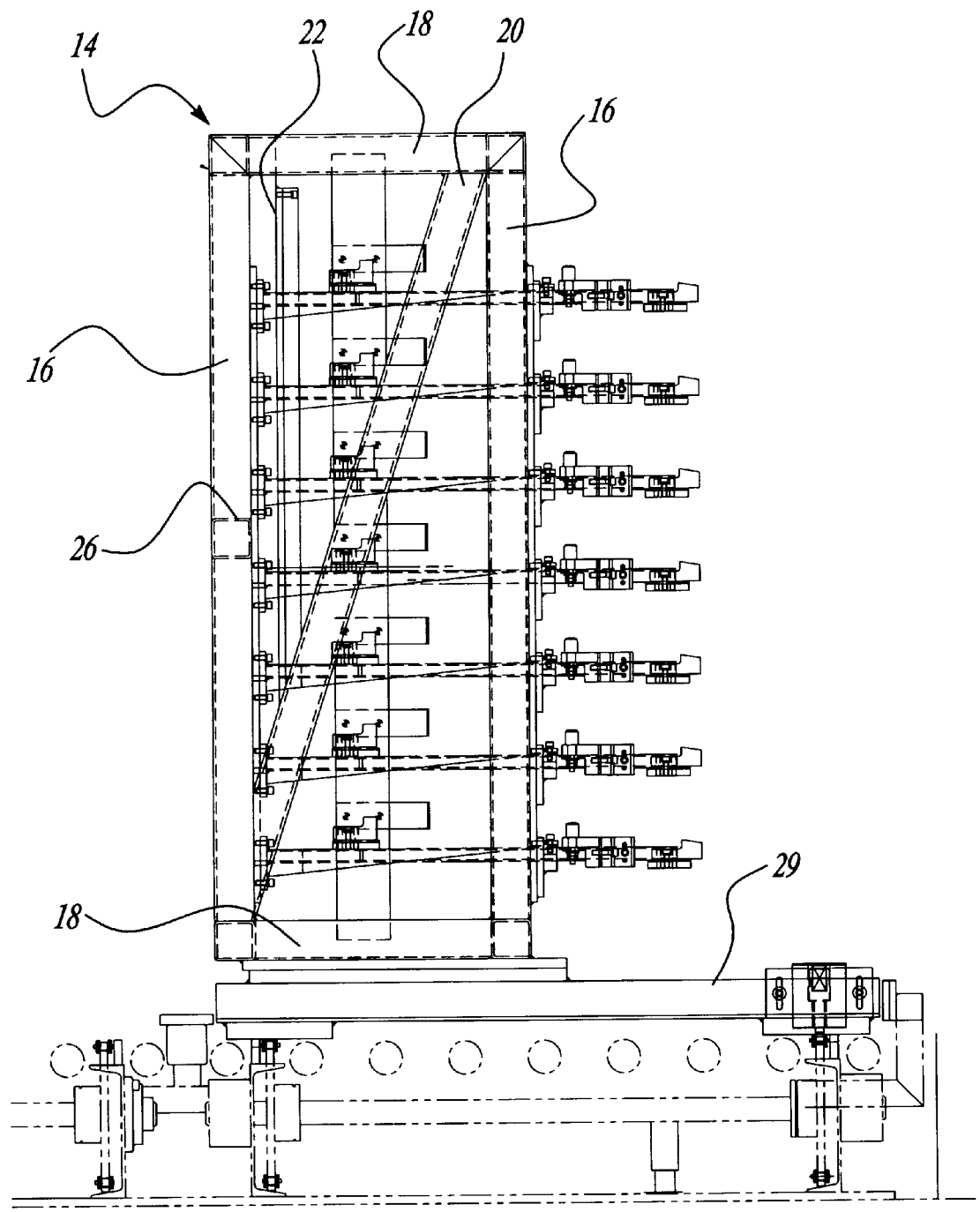
FIG. 4 is a view similar to FIG. 3 without the vehicle hoods illustrated.
Figure 5:
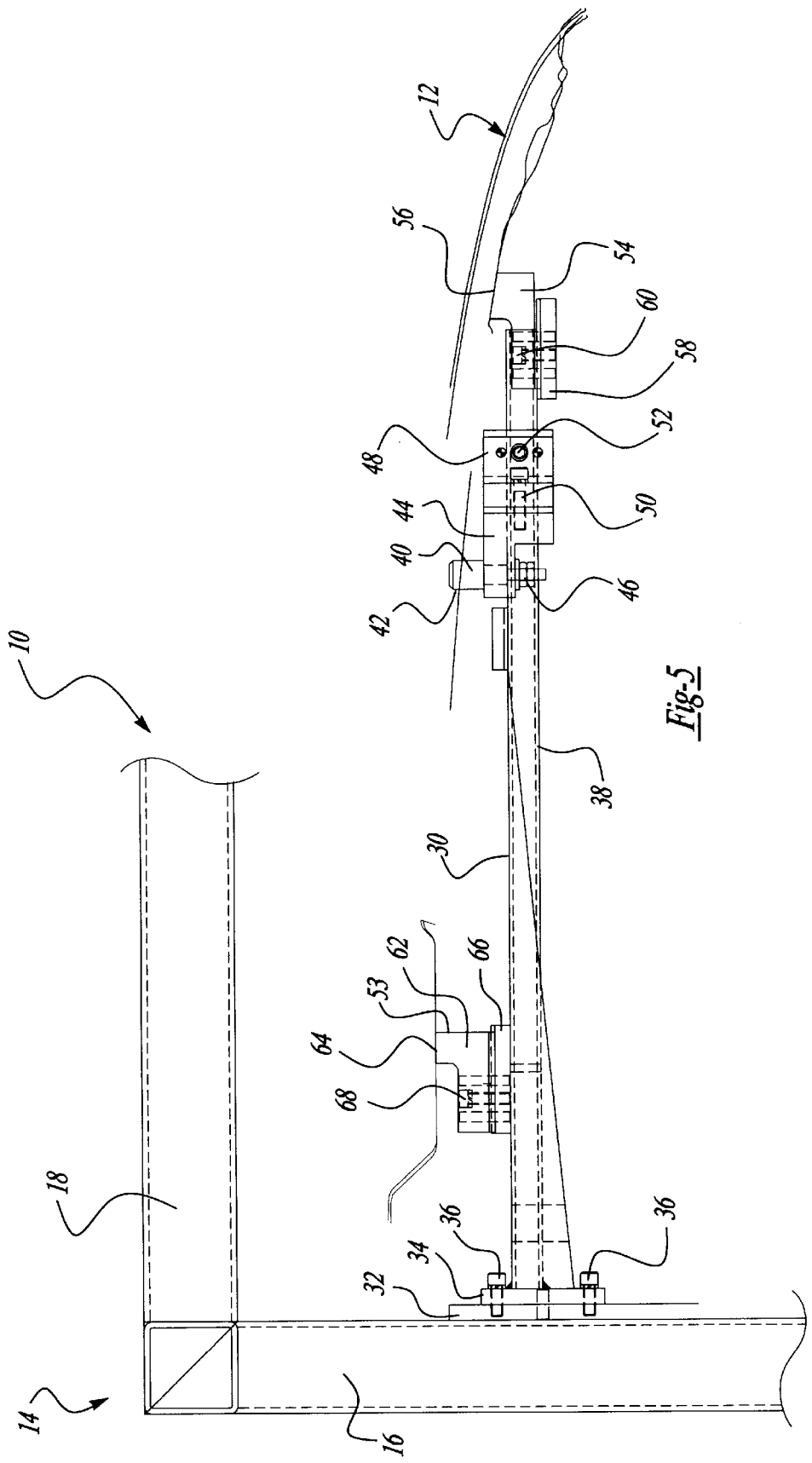
FIG. 5 is an enlarged side elevational view of a portion of the precision holding system of FIG. 1 illustrating a portion of a vehicle hood.
Figure 6:
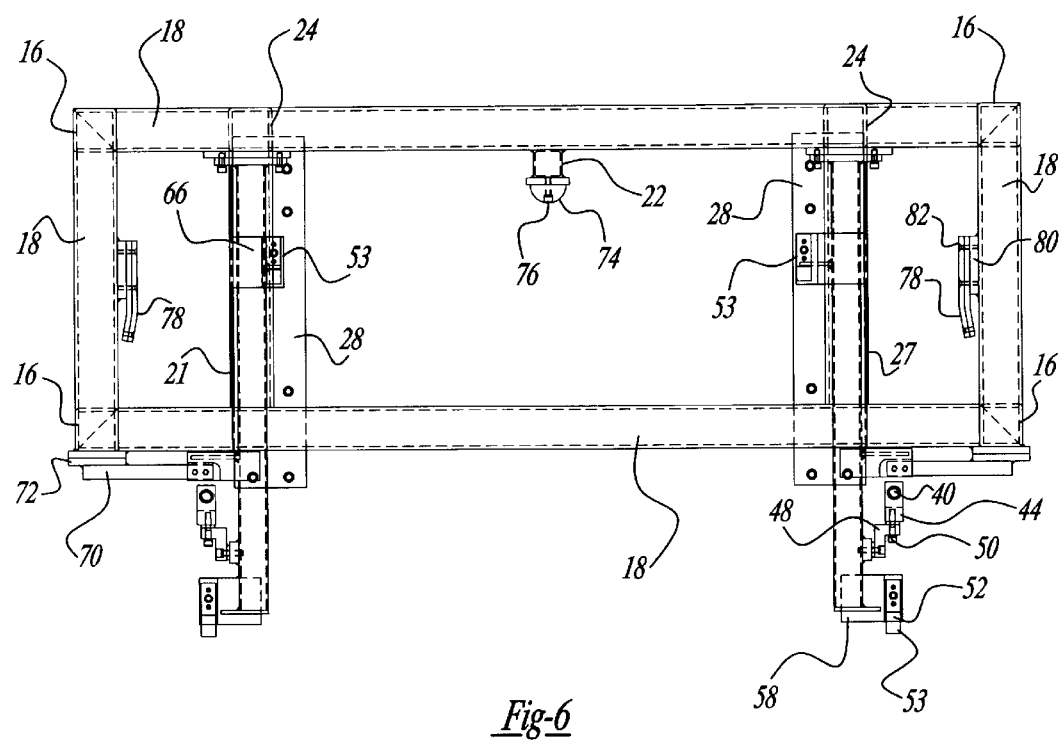
FIG. 6 is a plan view of the precision holding system of FIG. 1 without the vehicle hoods illustrated.

Referring to FIGS. 2, 4 and 6, the precision holing system includes a frame, generally indicated at 14. The frame 14 includes a plurality of column members 16 extending vertically at four corners thereof. The frame 14 also includes a plurality of beam members 18 extending horizontally between the column members 16 at a top and bottom thereof to form a generally rectangular shape for the frame 14. The column members 16 and beam members 18 are made of a metal material such as aluminum. The column members 16 and beam members 18 are tubular and generally rectangular in shape and secured to each other by suitable means such as welding.

The frame 14 includes a side brace member 20 extending between opposed top and bottom beam members 18 on each side thereof. Preferably, the brace member 18 has a lower end secured by suitable means such as welding to a lower end of a column member 16 and extending vertically at an angle with an upper end secured by suitable means such as welding to the top beam member 18. The frame 14 also includes a rear support member 22 extending vertically between rearward top and bottom beam members 18 and secured thereto by suitable means such as welding. The frame 14 further includes a pair of arm support members 24 spaced transversely and extending vertically between rearward top and bottom beam members 18 and secured thereto by suitable means such as welding. It should be appreciated that the rear support member 22 is disposed between the arm support members 24.

The frame 14 includes a cross member 26 extending horizontally between the arm support members 24 and secured thereto by suitable means such as welding. The frame 14 further includes a pair of bottom support members 27 spaced transversely and extending longitudinally between an opposed bottom beam members 18 and secured thereto by suitable means such as welding. The side brace members 20, rear support member 22, arm support members 24, cross member 26 and bottom support members 27 are made of a metal material such as aluminum. The side brace members 20, rear support member 22, arm support members 24, cross member 26 and bottom support members 27 are tubular and generally rectangular in shape.

The frame 14 includes a rest plate 28 attached to each bottom support member 27 by suitable means such as welding. The rest plates 28 may be attached to or rest on a stationary support surface or a mobile support surface 29 such as wheels or a conveyor. The support surface 29 will not be described as it forms no part of the invention.

Referring to FIGS. 1 through 6, the precision holding system 10 also includes at least one, preferably a plurality of arms 30 extending horizontally and longitudinally from the frame 14. Preferably, a pair of arms 30 are spaced transversely to hold a single vehicle hood 12. Preferably, there are a plurality of spaced pairs of arms 30 spaced vertically along the arm supports 24 of the frame 14. The frame 14 has an arm plate 32 extending vertically along a portion of each of the arm supports 24. The arm plate 32 is made of a metal material such as aluminum. The arm plate 32 is generally rectangular in shape and secured to the arm support 24 by suitable means such as welding. Each arm 30 has a mounting plate 34 at one end thereof. The mounting plate 32 is made of a metal material. The mounting plate 32 is generally rectangular in shape. The mounting plate 34 is secured to the arm plate 32 by suitable means such as fasteners 36. It should be appreciated that the frame 14 may have a height to accommodate a plurality of vehicle hoods 12 such as seven.

Each arm 30 includes an arm portion 38 extending horizontally and longitudinally from the mounting plate 34 past the forward beam members 18. Each arm 30 also includes a master control pin 40 to be disposed within a portion or recess 42 of the vehicle hood 12. The master control pin 40 is attached to a first bracket 44 by suitable means such as fasteners 46. The first bracket 44 is attached to a second bracket 48 by suitable means such as fasteners 50. The second bracket 48 is attached by suitable means such as fasteners 52 to the arm portion 38. The master control pin 40 and brackets 44 and 48 are made of a metal material. It should be appreciated that the master control pin 40 is disposed in a master location opening 42 of the vehicle hood 12 to locate the vehicle hood 12 relative to the frame 12.

Each arm 30 includes at least one, preferably a plurality of master control rests 53 to hold or allow the vehicle hood 12 to rest in a horizontal, design position. The master control rests 53 include a forward master control rest 54 having a master control surface 56 complementary in an X, Y and Z direction or plane to a forward master control surface on an inner panel of the vehicle hood 12. In this example, the master control surface 56 is inclined relative to the arm 30. The forward master control rest 54 is attached to a support plate 58 by suitable means such as fasteners 60. The support plate 58 is generally rectangular in shape and made of a metal material. The support plate 58 is attached to the arm portion 38 of the arm 30 by suitable means such as welding.

The master control rests 53 include a rear master control rest 62 having a master control surface 64 complementary in an X, Y and Z direction or plane to a rear master control surface on the inner panel of the vehicle hood 12. In this example, the master control surface 64 is horizontal and generally parallel to the arm 30. The rear master control rest 56 is attached to a support plate 66 by suitable means such as fasteners 68. The support plate 66 is generally rectangular in shape and made of metal material. The support plate 66 is attached to the arm portion 38 of the arm 30 by suitable means such as welding. It should be appreciated that the master control rests 53 are located along the arm 30 relative to the master control pin 40 such that they engage master control surfaces on the vehicle hood 12 that are engaged by similar supports when installed on a vehicle in its intended "design" position. It should also be appreciated that the design position is the position the vehicle hood 12 is intended to be in when installed on a vehicle to provide the proper fit and finish between body panels of the vehicle.

The precision holding system 10 also includes a forward support 70 to support each arm 30 in a horizontal position. The forward support 70 includes a mounting plate 72 attached to a forward column member 16 by suitable means such as fasteners or welding. The mounting plate 72 is generally rectangular in shape and made of a metal material. The forward support 70 extends transversely to the arm 30 and is attached thereto by suitable means such as welding. The forward support 70 is generally rectangular in shape and made of a metal material.

The precision holding system 10 may include a rear bumper 74 extending along a portion of the rear support member 22 and attached thereto by suitable means such as fasteners 76. The precision holding system 10 may also include side bumpers 78 attached to side plates 80 extending between the upper and lower beam members 18 on each side of the frame 14 by suitable means such as fasteners 82. The side plates 80 are generally rectangular in shape and made of a metal material. The side plates are attached to the beam members 18 by suitable means such as welding. The bumpers 74 and 78 are made of a resistant material such as foam to guide the vehicle hoods 12 in the frame 14. It should be appreciated that the bumpers protect the vehicle hoods 12 from damage, scratches, etc. with the frame 14.

In operation, an inner and outer panel of the vehicle hood 12 are secured together using an adhesive made of two components as is known in the art. The vehicle hood 12 is loaded into the precision holding system 10 across a transversely spaced pair of arms 30 such that the master control pin 30 is disposed within the master control opening 42 and the master control surfaces 56 and 64 engage the master control surfaces of the vehicle hood 12. As a result, the vehicle hood 12 is held in a precision manner and allowed to rest by gravity in a horizontal, design position while the adhesive sets up or is allowed to cure, thus gaining bonding strength and preventing twist in the vehicle hood 12 while the adhesive cures.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A precision holding system for a vehicle hood comprising:

a frame extending vertically;

at least one pair of arms spaced transversely and extending horizontally from said frame; and each of said arms including a master control pin to be disposed within a portion of a vehicle hood to locate the vehicle hood relative to said frame and a plurality of master control surfaces extending above a surface of said arms to hold the vehicle hood in a horizontal, design position while an adhesive between components of the vehicle hood cures.

2. A precision holding system for a vehicle hood comprising:

a frame extending vertically;

at least one pair of arms spaced transversely and extending horizontally from said frame;

each of said arms including a master control pin to be disposed within a portion of a vehicle hood to locate the vehicle hood relative to said frame and a plurality of master control surfaces to hold the vehicle hood in a horizontal, design position while an adhesive between components of the vehicle hood cures; and wherein each of said arms has one of said master control surfaces located near a forward end thereof and another of said master control surfaces located near a rearward end thereof and said master control pin being located between said master control surfaces.

3. A precision holding system as set forth in claim 2 wherein each of said master control surfaces has a shape complementary to a portion of the vehicle hood that said master control surfaces engage.

4. A precision holding system for a vehicle hood comprising:

a frame extending vertically;

at least one pair of arms spaced transversely and extending horizontally from said frame;

each of said arms including a master control pin to be disposed within a portion of a vehicle hood to locate the vehicle hood relative to said frame and a plurality of master control surfaces to hold the vehicle hood in a horizontal, design position while an adhesive between components of the vehicle hood cures; and a plurality of master control rests attached to said arms, each of said master control rests having one of said master control surfaces.

5. A precision holding system as set forth in claim 1 wherein said frame comprises a plurality of columns members and a plurality of beam members forming a generally rectangular shape.

6. A precision holding system as set forth in claim 5 including a support member extending vertically between opposed said beam members on each side of said frame.

7. A precision holding system a set forth in claim 5 including a rear support member extending vertically between opposed beam members at a rear of said frame.

8. A precision holding system as set forth in claim 5 including an arm support member attached to of said column members and extending transversely and attached to one of said arms.

9. A precision holding system as set forth in claim 1 including fasteners for securing said arms to said frame.

10. A precision holding system as set forth in claim 1 wherein said frame is made of an aluminum material.

11. A precision holding system as set forth in claim 1 including means attached to said frame to resist damage of the vehicle hood when loaded into said frame.

12. A precision holding system for vehicle hoods comprising:

a frame extending vertically;

a plurality of pairs of arms spaced transversely and extending horizontally from said frame; and each of said pairs of arms including a master control pin to be disposed within a portion of a vehicle hood to locate the vehicle hood relative to said frame and a plurality of master control surfaces extending above a surface of said arms to hold the vehicle hood in a horizontal, design position while an adhesive between components of the vehicle hood cures.

13. A precision holding system for vehicle hoods comprising:

a frame extending vertically;

a plurality of pairs of arms spaced transversely and extending horizontally from said frame;

each of said pairs of arms including a master control pin to be disposed within a portion of a vehicle hood to locate the vehicle hood relative to said frame and a plurality of master control surfaces to hold the vehicle hood in a horizontal, design position while an adhesive between components of the vehicle hood cures; and wherein each of said arms has one of said master control surfaces located near a forward end thereof and another of said master control surfaces located near a rearward end thereof and said master control pin being located between said master control surfaces.

14. A precision holding system as set forth in claim 13 wherein each of said master control surfaces has a shape complementary to a portion of the vehicle hood that said master control surfaces engage.

15. A precision holding system as set forth in claim 14 including a plurality of master control rests attached to said arms, each of said master control rests having one of said master control surfaces.

16. A precision holding system as set forth in claim 12 wherein said frame comprises a plurality of columns members and a plurality of beam members forming a generally rectangular shape.

17. A precision holding system as set forth in claim 16 including a support member extending vertically between opposed said beam members on each side of said frame.

18. A precision holding system a set forth in claim 17 including a rear support member extending vertically between opposed said beam members at a rear of said frame.

19. A precision holding system as set forth in claim 18 including an arm support member attached to of said column members and extending transversely and attached to one of said arms.

20. A precision holding system for a vehicle hood comprising:

a frame comprising a plurality of columns members, a plurality of beam members forming a generally rectangular shape, a support member extending vertically between opposed beam members on each side of said frame, and a rear support member extending vertically between opposed beam members at a rear of said frame;

a plurality of pairs of arms spaced transversely and extending horizontally from said frame;

each of said arms including a master control pin to be disposed within a portion of a vehicle hood to locate the vehicle hood relative to said frame and each of said arms has at least one master control surface located near a forward end thereof and another master control surface located near a rearward end thereof and said master control pin being located between said master control surfaces to hold the vehicle hood in a horizontal, design position while an adhesive between components of the vehicle hood cures.

* * * * *